US009008898B2

(12) United States Patent
Umesaka et al.

(10) Patent No.: US 9,008,898 B2
(45) Date of Patent: Apr. 14, 2015

(54) IN-VEHICLE ELECTRONIC CONTROL UNIT, DIAGNOSIS TOOL AND DIAGNOSIS SYSTEM

(75) Inventors: Takeo Umesaka, Obu (JP); Mikio Teramura, Okazaki (JP)

(73) Assignee: Denso Corporation, Kariya (JP)

( * ) Notice: Subject to any disclaimer, the term of this patent is extended or adjusted under 35 U.S.C. 154(b) by 127 days.

(21) Appl. No.: 13/450,568

(22) Filed: Apr. 19, 2012

(65) Prior Publication Data

US 2012/0271507 A1 Oct. 25, 2012

(30) Foreign Application Priority Data

Apr. 22, 2011 (JP) .................................. 2011-96291

(51) Int. Cl.
*G06F 17/00* (2006.01)
*B60W 50/04* (2006.01)
*G07C 5/08* (2006.01)

(52) U.S. Cl.
CPC .............. *G07C 5/0816* (2013.01); *G07C 5/085* (2013.01)

(58) Field of Classification Search
CPC ........... G06F 17/00; G06F 7/00; G07C 5/085; G07C 5/0825; B60W 10/06; B60W 50/04; F02D 41/2487
USPC ................................ 701/31.9, 33.2, 33.4, 35
See application file for complete search history.

(56) References Cited

U.S. PATENT DOCUMENTS 5,754,965 A 5/1998 Hagenbuch
5,980,081 A * 11/1999 Watari et al. .................... 700/79
6,006,146 A * 12/1999 Usui et al. .................... 701/31.9
6,012,004 A 1/2000 Sugano et al.
6,836,712 B2 * 12/2004 Nishina ........................ 701/33.4
7,079,927 B1 7/2006 Tano et al.

(Continued)

FOREIGN PATENT DOCUMENTS

JP 08-183410 7/1996
JP 2000-267944 9/2000

(Continued)

OTHER PUBLICATIONS

Office Action (2 pages) dated Apr. 16, 2013, issued in corresponding Japanese Application No. 2011-096291 and English translation (3 pages).

*Primary Examiner* — John Q Nguyen
*Assistant Examiner* — Aaron Smith
(74) *Attorney, Agent, or Firm* — Nixon & Vanderhye PC

(57) ABSTRACT

An in-vehicle electronic control unit (ECU), stores behavior information, when a specific vehicle behavior (i.e. a vehicle behavior that does not correspond to the driver's driving operation) is detected. The in-vehicle electronic control unit (ECU) stores, as the behavior information, vehicle travel information, a storage time of the vehicle travel information, and storage execution information that indicates that the vehicle travel information is stored. When the engine of the vehicle stops, the ECU first executes an abnormality check of a CPU operation, when, based on the storage execution information of the behavior information, the vehicle travel information is stored. The ECU stores, as abnormality check information, an abnormality check result, an execution time of the abnormality check, and check execution information indicating that the abnormality check has been executed, and after the storage of the abnormality check information, the ECU stops power supply to the CPU.

13 Claims, 8 Drawing Sheets

(56) References Cited

U.S. PATENT DOCUMENTS

2008/0255721 A1 10/2008 Yamada
2009/0076681 A1 * 3/2009 Yasue et al. .................... 701/35

FOREIGN PATENT DOCUMENTS

JP 2007-326425 12/2007
JP 2010-159698 7/2010

* cited by examiner

IN-VEHICLE ELECTRONIC CONTROL UNIT, DIAGNOSIS TOOL AND DIAGNOSIS SYSTEM

CROSS REFERENCE TO RELATED APPLICATION

The present application is based on and claims the benefit of priority of Japanese Patent Application No. 2011-96291, filed on Apr. 22, 2011, the disclosure of which is incorporated herein by reference.

TECHNICAL FIELD

The present disclosure generally relates to an in-vehicle electronic control unit as well as a diagnosis tool and a diagnosis system in a vehicle that stores vehicle travel information for the analysis of vehicle behaviors.

BACKGROUND

Conventionally, as disclosed in U.S. Pat. No. 5,754,965, a technique for diagnosing and analyzing vehicle behaviors based on detection signals of various sensors installed in a vehicle is well known. Further, a technique to memorize, as vehicle travel information, output information of various sensors at a time of collision or the like, before and after an impact is also known.

Further, in a conventional diagnosis scheme a diagnostic code is stored at a time of sensor/actuator abnormality. In addition, time-lapse sensor outputs and time-lapse control data outputs is stored as the vehicle travel information (i.e., freeze frame data).

However, the diagnostic code and the freeze frame data are stored only at a time of sensor/actuator abnormality in the conventional diagnosis scheme. Therefore, such scheme does not enable the storage of the vehicle travel information at a time of, for example, a non-corresponding vehicle behavior that does not correspond to a driver's driving operation while no sensor/actuator abnormality is observed. As a result, even when the non-corresponding vehicle behavior is being generated, a cause of such vehicle behavior may not be analyzed based on the vehicle travel information in the conventional diagnosis scheme.

SUMMARY

In view of the above and other problems, the present disclosure provides an in-vehicle electronic control unit as well as a diagnosis tool and a diagnosis system in a vehicle, which suitably memorizes vehicle travel information for the analysis of the cause of a vehicle behavior when a certain vehicle behavior is generated.

When the inventor of the present disclosure conceived an idea of storing vehicle travel information in a rewritable memory that retains data during a drive stop time of the vehicle in association with a specific vehicle behavior and analyzing a cause of the specific vehicle behavior based on the stored vehicle travel information, one thing comes to the mind of the inventor that the specific vehicle behavior may be caused by an abnormal operation of a central processing unit (CPU) that executes a vehicle control process.

However, even if the driver brings the vehicle to a dealership or the like after experiencing a vehicle behavior that does not correspond to the driver's driving operation, the vehicle travel information may only be retrieved from the rewritable memory but information regarding a CPU operation condition may not be available in case that the drive of the vehicle has already been stopped at least once before arriving at the dealership. That is, an abnormal operation of the CPU may not be reproduced after the restart of the drive of the vehicle, and the abnormal operation of the CPU may not be detected by the diagnosis at the dealership.

As a result, the vehicle travel information at the time of the specific vehicle behavior may not be sufficient for determining whether such vehicle behavior has been caused by the abnormal operation of the CPU or caused by other factors. That is, the vehicle travel information may not be sufficient for appropriately determining the cause of the specific vehicle behavior.

Therefore, in an aspect of the present disclosure, an in-vehicle electronic control unit installed in a vehicle may include a CPU to execute a vehicle control process, a behavior check unit that determines whether a specific vehicle behavior is detected, a behavior information storage unit that stores in a memory, which retains data during a drive stop time of the vehicle, vehicle travel information as behavior information of the vehicle when the behavior check unit determines a specific vehicle behavior is detected, an abnormality check unit that executes an abnormality check to determine whether an operation of the CPU is abnormal during a time period after the storage of the vehicle travel information in the memory unit by the behavior information storage unit and before a shutoff of a power supply at the drive stop time of the vehicle, and a check result storage unit that stores in the memory unit an abnormality check result of the abnormality check unit as abnormality check information.

In such manner, upon checking whether a specific vehicle behavior is detected and storing the vehicle travel information, the abnormality check result of determining whether the CPU operation is abnormal or not is stored in the memory unit at a time before the vehicle is turned off (i.e. the drive stop time).

As a result, if the abnormality check result, which is stored, indicates that the operation of the CPU is normal, the stored vehicle travel information is retrieved and the cause of the specific vehicle behavior is analyzed based on the retrieved vehicle travel information. On the other hand, if the abnormality check result indicates that the operation of the CPU is abnormal, the stored vehicle travel information is not used, and it is analyzed and determined that the specific vehicle behavior may be caused by the abnormal operation of the CPU.

Note that, in an analysis of the specific vehicle behavior based on the vehicle travel information stored at a time of the specific vehicle behavior, it is important to store the abnormality check result, which is a check result of whether the CPU operation is abnormal or not. In other words, based on the storage of such abnormality check result of the CPU operation, the cause of the specific vehicle behavior is appropriately analyzed and determined based on the stored vehicle travel information.

In addition to the above configuration, when the vehicle travel information is stored in the memory unit, the abnormality check unit executes the abnormality check at the drive stop time of the vehicle. Since the vehicle control process that is executed by the CPU is limited at the drive stop time of the vehicle, influence on the vehicle control due to executing the abnormality check of the CPU operation is significantly reduced.

In addition to the above configuration, the abnormality check unit may evaluate a part of a memory area that is used by the CPU, instead of evaluating the abnormality check for an entire memory area. By checking a part of the memory area and not checking an entire memory area, the time required for the abnormality check of the CPU operation is reduced, thereby reducing the overall influence of the abnormality check on the vehicle control.

In addition to the above configuration, an execution condition check unit determines whether an execution condition of the abnormality check is satisfied when the behavior information storage unit stores in the memory unit the vehicle travel information. When the execution condition check unit determines that the execution condition of the abnormality check is satisfied, the abnormality check unit executes the abnormality check.

In such manner, when the specific vehicle behavior is detected and the vehicle travel information is stored, the abnormality check of the CPU operation is executed, only when the execution condition of the abnormality check is satisfied. For example, by defining the execution condition of the abnormality check as a condition that the vehicle is traveling, or as a condition that no other high-priority process having a higher priority than the abnormality check is being executed, or the like, the influence of the CPU operation abnormality check on the vehicle control is reduced to a lowest-possible level.

In addition to the above configuration, the behavior information storage unit stores in the memory unit, as a part of the behavior information, a time of storing the vehicle travel information, and the check result storage unit stores in the memory unit, as a part of the abnormality check information, a time of executing the abnormality check by the abnormality check unit. Based on the time difference between a time of storing the vehicle travel information upon detecting the specific vehicle behavior and a time of executing the abnormality check of the CPU operation, a degree of relevance between the vehicle travel information stored due to the generation of the specific vehicle behavior and the abnormality check result of the CPU operation is determined. For example, when such time difference is short, it may be determined that the relevance between (a) the operation condition of the CPU indicated by the abnormality check result of the CPU operation and (b) the generation of the specific vehicle behavior is high, and, when such time difference is long, it may be determined that the relevance between the above (a) and (b) is low.

When the abnormality check of the CPU operation cannot be executed even when the vehicle travel information is stored upon detecting the specific vehicle behavior, the CPU operation may possibly be abnormal. Therefore, processing of the vehicle travel information based on the abnormality check result of the CPU operation may yield a false processing result.

Thus, in addition to the above configuration, the check result storage unit stores in the memory unit, as a part of the abnormality check information, check execution information that indicates whether the abnormality check unit has executed the abnormality check. When the check execution information indicates that the abnormality check has been executed, the vehicle travel information is "safely" processed based on the abnormality check result, and, when the check execution information does not indicate that the abnormality check has been executed, a process that determines that the vehicle travel information has low reliability or a similar process may be executed, since normality of the CPU operation cannot be determined under such circumstance.

Further, an abnormal condition of the CPU operation may only be temporary, and may not be recognized unless the abnormality check of the CPU operation is executed as soon as possible after the storage of the vehicle travel information. If the abnormality check is executed after resolving the abnormal condition of the CPU operation, such abnormality check yields a "normal" check result. As a result, the determination that the vehicle travel information is stored by a normal CPU operation may be incorrect, if the CPU operation is only based on the abnormality check result in the memory unit, even when the vehicle travel information has actually been stored by an abnormal CPU operation. In such a case, the cause of generation of the specific vehicle behavior may be incorrectly analyzed.

Therefore, in addition to the above configuration, the abnormality check unit executes the abnormality check as soon as the vehicle travel information is stored in the memory unit. Therefore, immediately after the storage of the vehicle travel information, the abnormality determination of whether the CPU operation is normal or abnormal is determined at an earliest-possible timing before the change of the CPU operation condition, before the abnormal CPU operation condition changes back to normal.

In addition to the above configuration, a diagnosis tool may be coupled to the in-vehicle electronic control unit to read, via a read unit, the behavior information and the abnormality check information from the memory unit of the in-vehicle electronic control unit. When the information read indicates that the vehicle travel information is stored in the memory unit, an output unit of the diagnosis tool outputs the behavior information and the abnormality check information, when the abnormality check result of the abnormality check information indicates that the CPU operation is normal. Alternatively, when the abnormality check result of the abnormality check information indicates that the CPU operation is abnormal, the output unit of the diagnosis tool outputs a CPU operation abnormality warning, and may additionally output the abnormality check information behind the behavior information. Therefore, based on the reading of data by the diagnosis tool from the in-vehicle electronic control unit, the diagnosis tool automatically controls its output so that whether the CPU operation is normal or abnormal is distinguished.

In addition to the above configuration, based on a reading of the behavior information and the abnormality check information from the memory unit, if the vehicle travel information is stored in the memory unit, the output unit of the diagnosis tool coupled to the in-vehicle electronic control unit outputs the behavior information and the abnormality check information, when the check execution information of the abnormality check information indicates that the abnormality check has been executed while the vehicle travel information is stored in the memory unit, and the output unit outputs, in addition to the behavior information and the abnormality check information, a warning that warns that the abnormality check has not been executed if the check execution information of the abnormality check information indicates that the abnormality check has not been executed. In such manner, the diagnosis tool automatically controls its output so that whether the abnormality check of the CPU has been executed or not is distinguished, based on the behavior information and the abnormality check information that are read from the in-vehicle electronic control unit by the diagnosis tool.

BRIEF DESCRIPTION OF THE DRAWING

Objects, features, and advantages of the present disclosure will become more apparent from the following detailed description made with reference to the accompanying drawings, in which.

DETAILED DESCRIPTION

Figure 1:
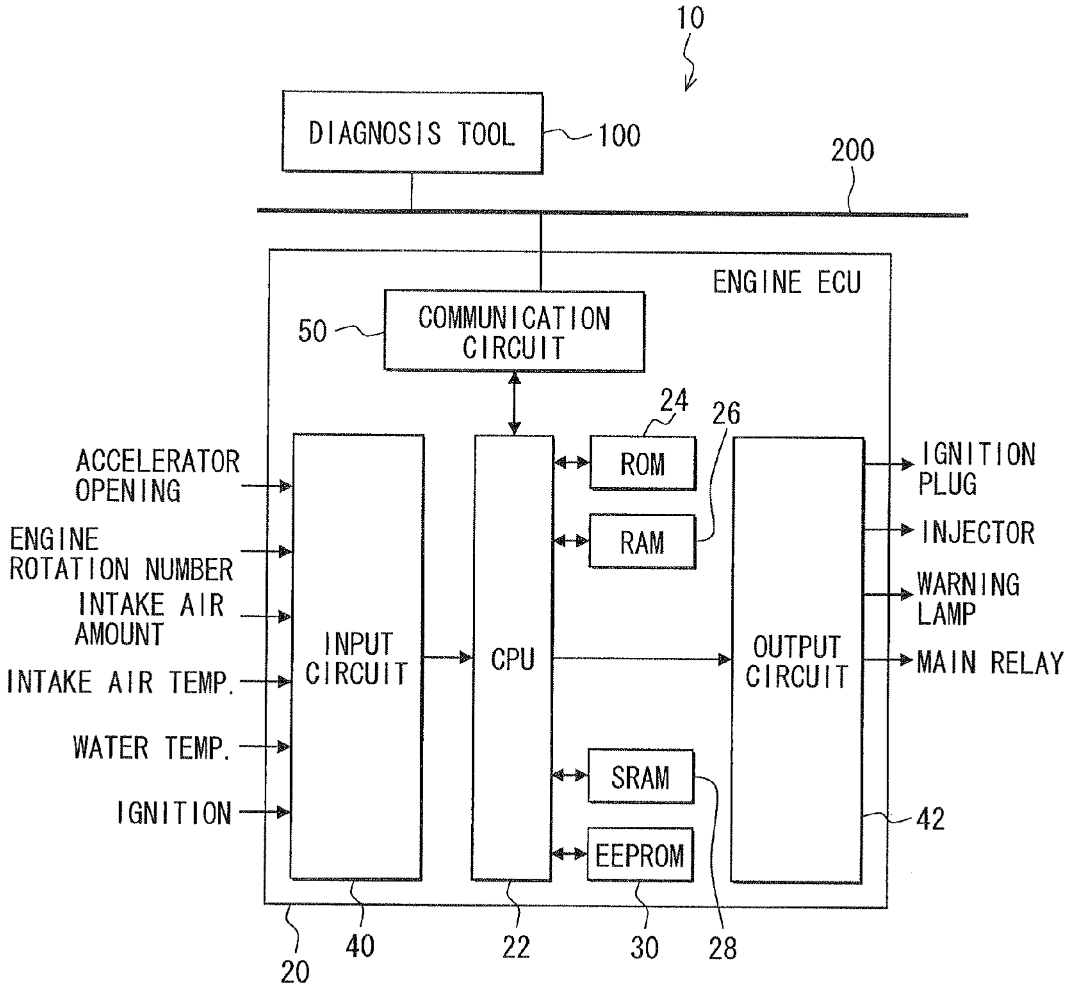
FIG. 1 is a block diagram of a diagnosis system of the present disclosure.
Figure 2:
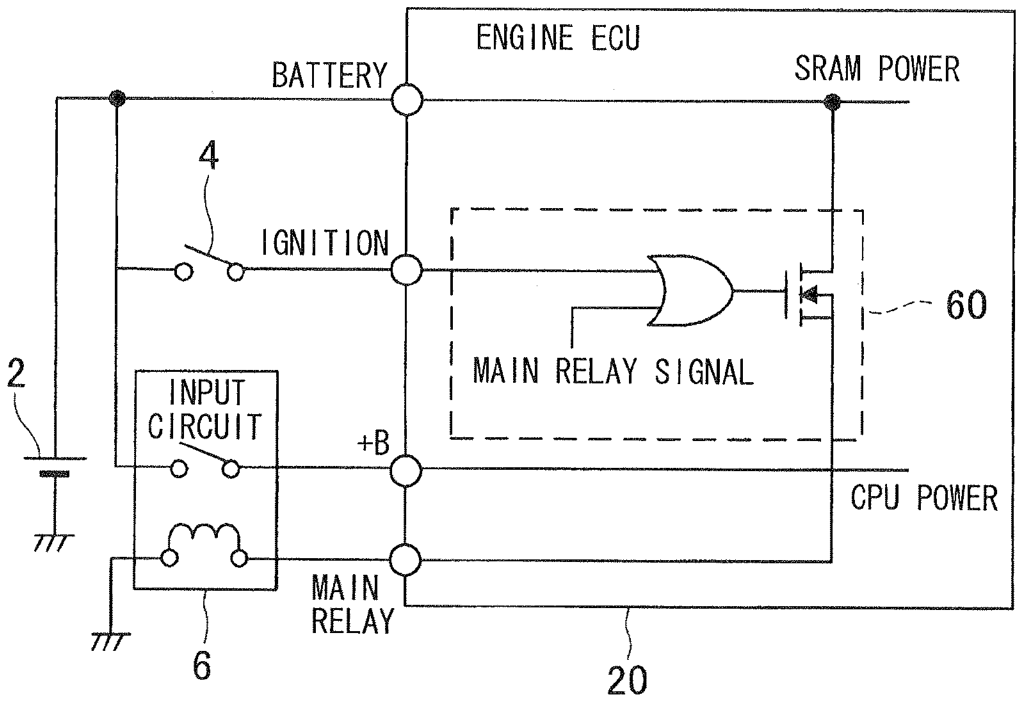
FIG. 2 is a circuit diagram of a power control circuit for supplying power to an ECU of the diagnosis system of the present disclosure.

The embodiment of the present disclosure is explained in the following based on the drawings. With reference to FIGS. 1 and 2, a diagnosis system 10 includes an engine electronic control unit (ECU) 20, which may simply be referred to as ECU in the following, and a diagnosis tool 100. ECU 20 includes CPU 22, ROM 24, RAM 26, SRAM (standby RAM) 28, EEPROM 30, an input circuit 40, an output circuit 42, a communication circuit 50 and a main relay control circuit 60.

By controlling CPU 22, which executes a stored control program in ROM 24, ECU 20 receives detection signals, such as an accelerator opening, an engine rotation number, an intake air amount, intake air temperature, water temperature, ignition ON/OFF, and the like, from various sensors through the input circuit 40. Based on the detection signals, ECU 20 outputs control signals, such as a fuel injection control of the fuel injector, an ignition control of the spark plug, a lighting control of the warning light, a main relay control of the power supply, and the like, through the output circuit 42.

RAM 26, which loses data when power supply is shutoff, is used as a work memory of the control program of ECU 20. SRAM 28 is, on the other hand, configured to always receive power supply from a battery 2, regardless of turning on and off of the ignition switch 4. Therefore, data stored in SRAM 28 is saved unless the power supply is interrupted at a time of replacement of the battery 2. EEPROM 30 is a non-volatile memory unit, and contents of the EEPROM 30 is rewritable. Therefore, even if power supply from the battery 2 is interrupted, data stored in EEPROM 30 is saved.

A communication circuit 50 is used to communicate with other ECUs through communication line 200 of an in-vehicle local area network (LAN), such as controller area network (CAN) in a vehicle, and is also used to transmit information stored in SRAM 28 or in EEPROM 30 to the diagnosis tool 100 through the communication line 200.

With reference to FIG. 2, when ECU 20 turns on a main relay signal, the main relay control circuit 60 keeps a main relay 6 in an on state, and ECU 20 receives power supply from the battery 2 even if the ignition switch 4 is turned off. When the ignition switch 4 and the main relay signal are both turned off, the power supply for CPU 22 is shut off due to the turning off of the main relay 6.

The diagnosis tool 100 includes a microcomputer, which includes CPU, ROM, RAM, and the like. The diagnosis tool 100, through its connection to the communication line 200, reads behavior information when a specific vehicle behavior is detected and reads abnormality check information including the abnormality check result of the operation of CPU 22 from ECU 20, and outputs the readout information to a display unit or the like.

ECU 20 controls CPU 22 to execute the control program stored in ROM 24. The following, provides the various function units realized by the ECU 20.

(Behavior Check Unit)

ECU 20 has preset behavior definitions of specific vehicle behaviors, such as items (1) and (2) described below, and based on the detection signal of various sensors, ECU 20 determines whether an actual vehicle behavior matches or corresponds with one of preset behavior definitions. The specific vehicle behaviors are vehicle behaviors that do not correspond to a driving operation of the vehicle performed by a driver. For example, (1) when the driver does not step on an accelerator pedal, a throttle opening exceeds a predetermined degree of opening (e.g., 5 degrees), or (2) when a shift position is in a neutral range, the engine rotation number suddenly rises above 2000 rpm.

(Behavior Information Storage Unit)

When the actual vehicle behavior corresponds with one of the specific vehicle behaviors, ECU 20 stores as a behavior information all of the following in SRAM 28 or EEPROM 30: (i) a storage execution information of whether the vehicle travel information at such time is stored; (ii) the time at which the vehicle travel information was stored ("time" in this case means "time of day" and not "a time period" or "a time length"); and (iii) the vehicle travel information, which is provided below. An initial value of the storage execution information is "no storage." The vehicle travel information may include the following information or data: an accelerator opening, an engine rotation number, a throttle opening, a shift position of the transmission, an intake air amount, temperature of intake air, water temperature, and a vehicle speed.

In addition to the above-described information, if the vehicle is equipped with an in-vehicle camera and/or a navigation system, image data and other vehicle travel condition based on such image data from the in-vehicle camera, may be stored as the vehicle travel information. In addition, a road shape, such as curvature of the road and inclination of the road based on map data, which may be provided by the navigation system, may also be stored as the vehicle travel information.

In the present embodiment, when a specific vehicle behavior is detected multiple times during a time line, the latest behavior information is stored by overwriting the behavior information previously stored. However, if suitable storage capacity is available, the behavior information for each of the detected specific vehicle behavior may be stored.

(Abnormality Check Unit)

When the behavior information is stored due to the detection of the specific vehicle behavior, a determination of whether the operation of CPU 22 is normal or abnormal is determined or checked before the drive of the engine is stopped (i.e. the engine speed is essentially zero) and the power supply to CPU 22 is shutoff.

The abnormality check of the operation of CPU 22 may be executed soon after the specific vehicle behavior is detected and the vehicle travel information at such time is stored, or may be executed at a time in between the stop of the engine and shutoff of power supply to the CPU 22.

When the abnormality check of the operation of CPU 22 is executed soon after the specific vehicle behavior is detected and after the vehicle travel information at such time is stored, the operation condition of CPU 22 at a time of generation of the specific vehicle behavior is checked advantageously before the operation condition of CPU 22 changes from the specific vehicle behavior generation condition, which may be a temporary phenomenon.

On the other hand, when the abnormality check of the operation of CPU 22 is executed at a time in between the stop of the engine and the shutoff of power supply to CPU 22, the operation condition of CPU 22 at a time of detecting the specific vehicle behavior is checked advantageously in a manner that reduces influence of the abnormality check on the vehicle control as much as possible.

A check method of CPU operation abnormality check may be provided as the following items of (1) to (5). The abnormality check may also be executed by any combination of the items (1) to (5).

(1) Data check of ROM 24 and RAM 26 is executed by examining a check sum of the stored data in ROM 24 and RAM 26. In such a case, the check sum may be calculated for an entire memory area of ROM 24 and RAM 26. When the vehicle is traveling, the check sum may be calculated only for a part of the memory area of ROM 24 and RAM 26.

By limiting the calculation of the check sum for only a part of the memory area, a time required for the abnormality check of CPU 22 may be reduced, thereby a wait time of other processes other than the abnormality check may also be reduced.

Further, when the memory area for which the check sum is calculated is limited, it is desirable that the check sum is calculated only for a memory area that stores a low priority vehicle control process data, such as diagnosis data for sensors and actuators, and is not calculated for a memory area that stores a high priority vehicle control process data, such as a fuel injection control data and the like. Therefore, access to the memory area of the high priority vehicle control process data by non-relevant processes is avoided (2) Data consistency check is executed after mirroring each of ROM 24 and RAM 26 (i.e., duplicating data of each of ROM 24 and RAM 26).

(3) The upper/lower limit value of the data in RAM 26 is checked. For example, the level of the output signal of a sensor is checked to determine if it is within a standard range.

(4) Temperature of CPU 22.

(5) Comparison of two calculation results. Specifically, a result of calculation of CPU 22 based on data acquired from other CPU may be compared with a result of calculation of other ECU based on the same data. If a mis-match between those two results is found, it may be determined that CPU 22 in the subject ECU 20 possibly has an operation abnormality.

(Check Result Storage Unit)

When ECU 20 determines whether or not the operation of CPU 22 is abnormal, ECU 20 stores, as the abnormality check information, all of (i) check execution information indicating whether or not the abnormality check of the operation of CPU 22 is executed, (ii) an abnormality check result, and (iii) time of checking abnormality ("time" means in this case "time of day").

In the present embodiment, an initial value of the check execution information is set to "not executed," and an initial value of the abnormality check result is set to "normal".

(Execution Condition Check Unit)

ECU 20 may check whether or not a condition for executing the abnormality check is satisfied when the abnormality check of the operation of CPU 22 is executed due to the detection of the specific vehicle behavior. The condition for executing the abnormality check may be, for example, a vehicle speed of zero, in which case the influence of the abnormality check on the vehicle behavior is reduced as much as possible. That is, when the vehicle speed becomes 0 and the engine is in an idling condition, the influence of the abnormality check of the operation of CPU 22 on the vehicle behavior can be reduced.

Processes in ECU 20 after the generation of the specific vehicle behavior and before the determination of the abnormality of the operation of CPU 22 are described with reference to FIGS. 3 to 5. The capital letter 'S' in those figures represents "step."

(First Behavior Information Storage Process and Abnormality Check Process)

Figure 3:
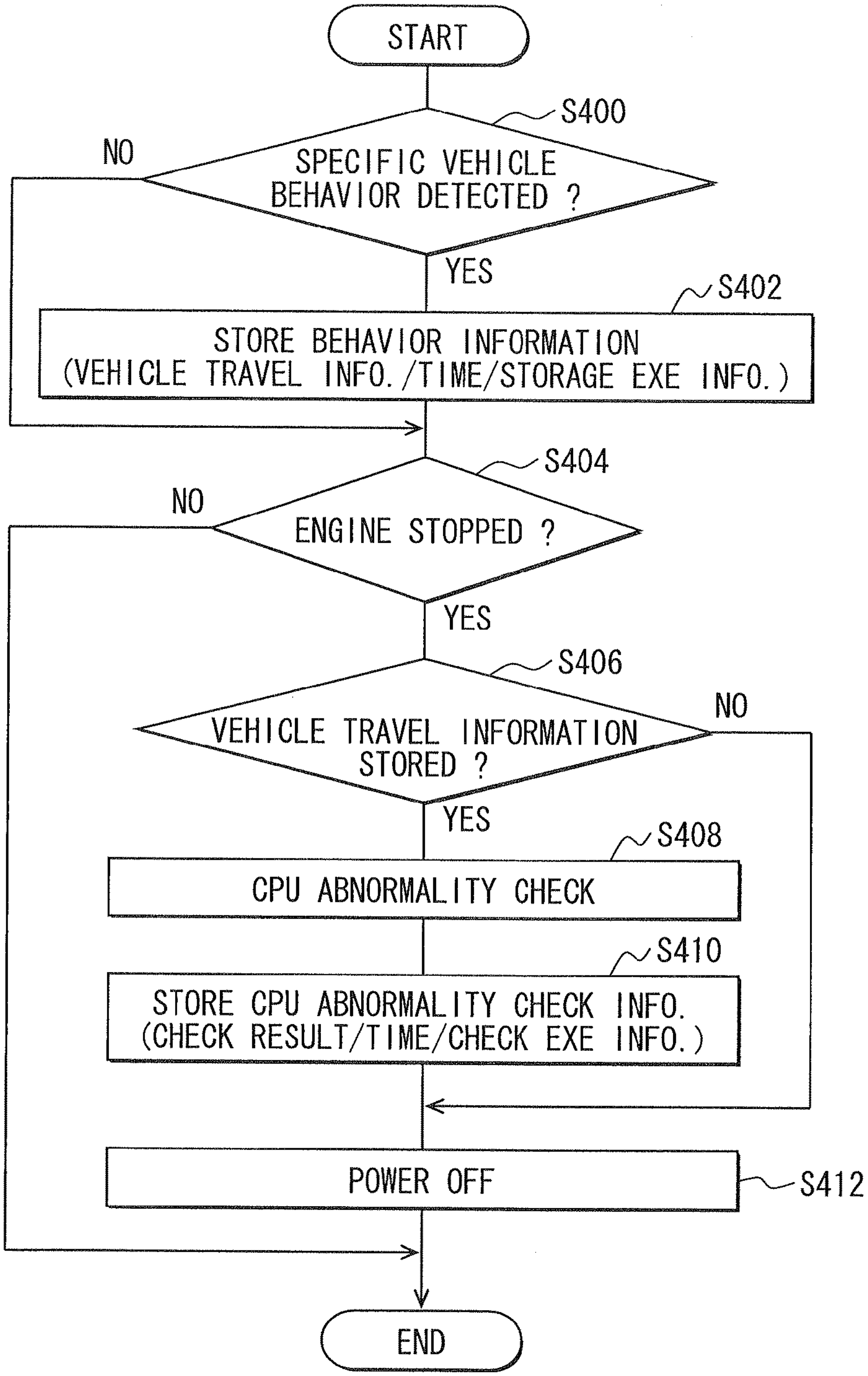
FIG. 3 is a flowchart of a first behavior information storage process and abnormality check process of the present disclosure.

FIG. 3 is a flowchart of a first behavior information storage process and abnormality check process performed by ECU 20. In S400, ECU 20 determines whether a specific vehicle behavior is detected. When the specific vehicle behavior is not detected (S400:No), ECU 20 shifts process to S404.

When the specific vehicle behavior is detected (S400:Yes), ECU 20, in S402, stores, in SRAM 28 or EEPROM 30, as the behavior information, (i) the storage execution information indicating that the vehicle travel information was stored, (ii) the time at which the vehicle travel information was stored, and (iii) the vehicle travel information at a time of detection of the specific vehicle behavior.

In S404, after the ignition switch is turned off, ECU 20 determines whether the engine has stopped, based on whether the engine rotation number is zero for at least one second or not, for example. When the engine has not stopped (S404:No), ECU 20 finishes the present process.

When the engine has stopped (S404:Yes), ECU 20 determines, based on the storage execution information of the behavior information stored in a predetermined area of SRAM 28 or EEPROM 30 (S406), whether the vehicle travel information was stored. When the vehicle travel information is not stored (S406:No), ECU 20 continues to S412.

When the vehicle travel information is stored (S406:Yes), ECU 20 executes the abnormality check of the operation of CPU 22 (S408), and stores, in SRAM 28 or EEPROM 30, as the abnormality check information, (i) the check execution information that indicates that the abnormality check is executed, (ii) the abnormality check result of whether the operation of CPU 22 is normal or abnormal, and (iii) time of execution of the operation abnormality check (S410).

In S412, ECU 20 turns off the main relay signal, and stops power supply for CPU 22 (S412).

In the first behavior information storage process and the abnormality check process of FIG. 3, the abnormality check of the operation of CPU 22 is executed after the engine has stopped and before the power supply is shut-off. Because of the limitation of vehicle control processes executed by CPU 22 at the time of stop of the vehicle driving, the influence of the abnormality check of the operation of CPU 22 on the vehicle control is reduced as much as possible.

(Second Behavior Information Storage Process and Abnormality Check Process)

Figure 4:
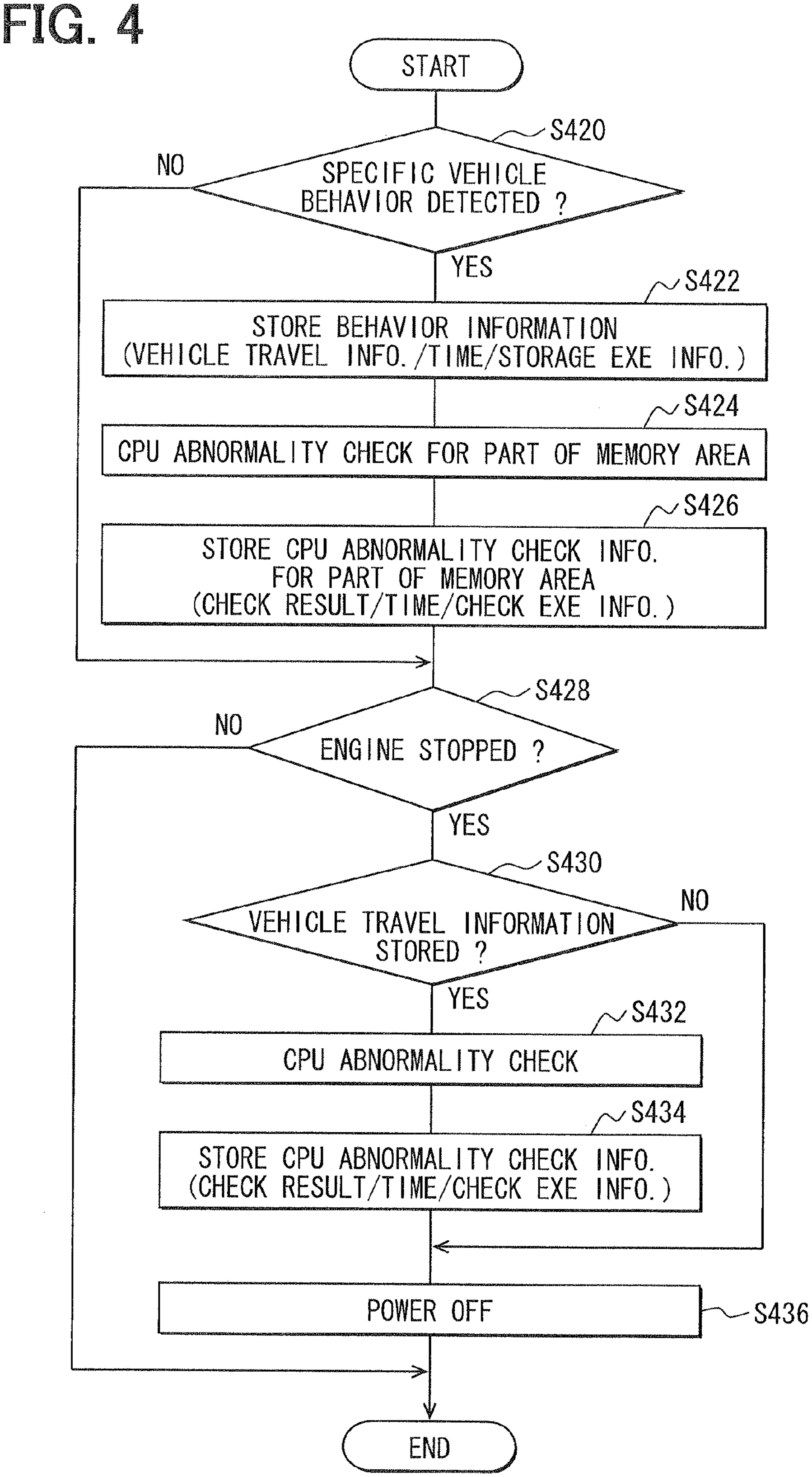
FIG. 4 is a flowchart of a second behavior information storage process and abnormality check process of the present disclosure.

FIG. 4 is a flowchart of the second behavior information storage process and abnormality check process performed by ECU 20. When comparing the process of FIG. 3 with the process of FIG. 4, S424 and S426 of FIG. 4 are new, and steps S420, S422, S428 to S436 of FIG. 4 are substantially the same as S400, S402, S404-S412 of FIG. 3, respectively.

In FIG. 4, when the specific vehicle behavior is not detected (S420:No), ECU 20 continues to S428. When the specific vehicle behavior is detected (S420:Yes), ECU 20, in S422, stores, in SRAM 28 or EEPROM 30, as the behavior information, (i) the storage execution information indicating that the vehicle travel information is stored (ii) the time at which the vehicle travel information was stored, and (iii) the vehicle travel information at a time of detection of the specific vehicle behavior.

ECU 20, in S424 determines whether the operation of CPU 22 is abnormal by calculating the sum check for a part of the memory area of SRAM 28 or EEPROM 30, and stores the abnormality check result, the time, and the check execution information as a during-drive abnormality check information, which is information of the abnormality check during the driving of the vehicle, in a memory area of SRAM 28 or EEPROM 30 (S426).

Subsequently, ECU 20 continues to S428. The process after S428 (i.e. S428-S436) is substantially the same as steps after S404 of FIG. 3 (i.e. S404-S412). In other words, in FIG. 4, when the engine has stopped (S428:Yes) and the vehicle information is stored (S430:Yes), the abnormality check of the operation of CPU 22 is executed (S432) and stored as a stop-time abnormality check information (i.e information of the abnormality check during the engine stop time) (S434) in the interval after the stop of the engine (S428:Yes), after the storage of the vehicle travel information due to the generation of the specific vehicle behavior (S430), and before shutoff of power supply (S436). Therefore, two check results are stored. Additionally, the CPU abnormality check result stored in S426 (i.e. the during-drive abnormality check information) is stored in a different memory area from the CPU abnormality check of S434 (i.e. the stop-time abnormality check information).

Therefore, the abnormality check of the operation of CPU 22 executed in S424 is only for a portion of the memory area used by CPU 22 (i.e., not the entire memory area), and by employing the above-described storage scheme, the broadest-possible memory area is checked for the abnormality of the operation of CPU 22 after the stop of the engine, and before the shutoff of power supply, for the purpose of improving the accuracy of the abnormality check.

In the second behavior information storage process and abnormality check process of FIG. 4, the abnormality check of the operation of CPU 22 is executed just after the specific vehicle behavior is detected and the vehicle travel information is stored. In such manner, when the specific vehicle behavior is detected and the vehicle travel information is stored, the operation of CPU 22 is quickly checked, in terms of whether the operation is abnormal or not, before the operation condition of CPU 22 changes.

Further, during the driving of the vehicle, the data check is executed only for a part of the memory area of ROM 24 and RAM 26 used by CPU 22, instead of the entire memory area, and the time required for the abnormality check of the operation of CPU 22 is reduced. Therefore, the wait time of the vehicle control processes other than the abnormality check is also reduced, thereby minimizing the influence of the abnormality check on the vehicle control.

In such case, it may be desirable to execute the data check only for the memory area that stores low priority vehicle control process data and not execute the data check for the memory area that stores high priority vehicle control process data.

(Third Behavior Information Storage Process and Abnormality Check Process)

Figure 5:
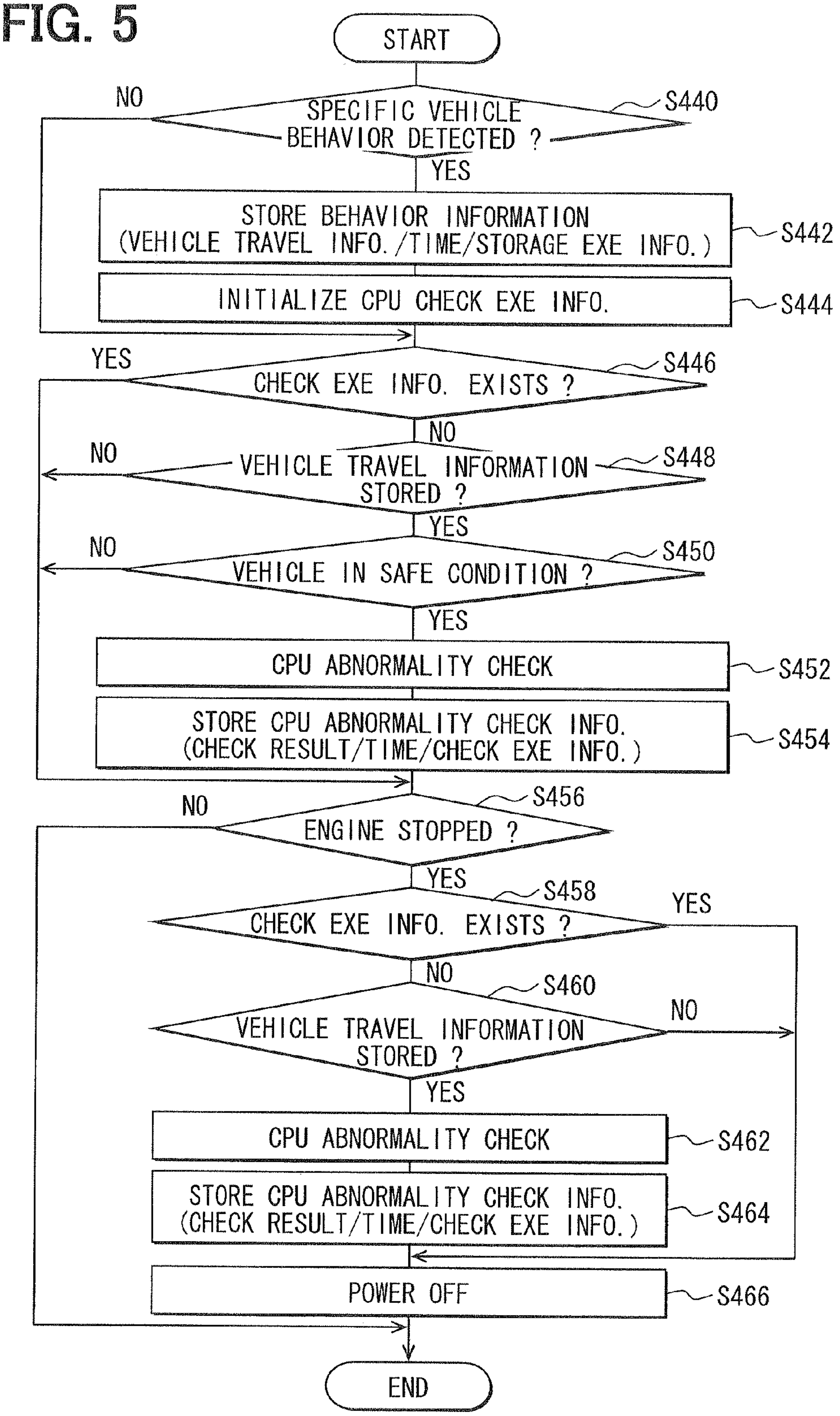
FIG. 5 is a flowchart of a third behavior information storage process and abnormality check process of the present disclosure.

FIG. 5 is a flowchart of the third behavior information storage process and abnormality check process performed by ECU 20. When comparing the process of FIG. 3 with the process of FIG. 5, S444, S446 to S454, and S458 of FIG. 5 are new. Other steps of FIG. 5, such as S440, S442, S456, S460 to S466, correspond to S400, S402, S404, and S406-S412 of FIG. 3, respectively.

With reference to FIG. 5, when the specific vehicle behavior is not detected (S440:No), ECU 20 continues to S446. When the specific vehicle behavior is detected (S440:Yes), ECU 20 stores, in SRAM 28 or EEPROM 30, as the behavior information (S442), (i) the storage execution information indicating that the vehicle travel information is stored (ii) i) the time at which the vehicle travel information was stored, and (iii) the vehicle travel information at a time of detection of the specific vehicle behavior. After the storage of the behavior information, ECU 20, in S444, initializes the check execution information, which indicates whether the abnormality check of the operation of CPU 22 is executed, and continues to S446.

The initialization allows the execution of the abnormality check of the operation of CPU 22, and, as described above, the initial value of the check execution information is "not executed." Specifically, when the specific vehicle behavior is detected multiple times on the time-line and the behavior information representing the specific vehicle behavior detected most recently overwrites the behavior information of the specific vehicle behavior previously stored, the check execution information is initialized in order to execute the abnormality check of CPU 22 against the behavior information of the specific vehicle behavior most recently detected (i.e. a latest behavior information of a latest specific vehicle behavior).

Based on the check execution information, ECU 20, in S446, determines whether the abnormality check of the operation of CPU 22 was executed. When the abnormality check of the operation of CPU 22 has already been executed once for the latest behavior information in the storage (i.e., judgment that the second-time abnormality check for the same latest behavior information is not required) (S446:Yes), ECU 20 continues to S456.

When the abnormality check has not been executed (S446:No), ECU 20 determines whether the vehicle travel information is stored based on the storage execution information (S448). When the vehicle travel information is not stored (S448:No), ECU 20 determines that there is no need to execute the abnormality check of the operation of CPU 22, and continues to S456.

When the vehicle travel information is stored (S448:Yes), ECU 20 determines if a vehicle travel condition is in a "safe" condition, in which, even if the abnormality check of the operation of CPU 22 is executed, the influence of such abnormality check for the vehicle behavior or vehicle control can be reduced or minimized. In other words, ECU 20 determines whether an execution condition for executing the abnormality check of the operation of CPU 22 is satisfied (S450). For example, the execution condition of the abnormality check of the operation of CPU 22 may be, as described above, the vehicle speed of 0. When the vehicle travel condition is not in the safe condition (S450:No), ECU 20 continues to S456.

When the vehicle travel condition is in the safe condition (S450:Yes), ECU 20 executes the abnormality check of the operation of CPU 22 in S452 and stores, in SRAM 28 or EEPROM 30, as the abnormality check information, the check execution information that indicates that the abnormality check was executed, the abnormality check result of whether the operation of CPU 22 is normal or abnormal, and time of execution of the operation abnormality check (S454). ECU 20 then continues to S456 to determine if the engine has stopped.

When the engine has not stopped after turning off of the ignition switch (S456:No), ECU 20 finishes the present process. When the engine stops (S456:Yes), ECU 20 in S458 determines whether the abnormality check of the operation of CPU 22 has been executed based on the check execution information.

When the abnormality check has already been executed (S458:Yes), ECU 20 shifts process to S466. This is because, when the abnormality check of the operation of CPU 22 has already been executed during the driving of the vehicle, it is feasible to determine that there is no need to execute the abnormality check at the engine stop time.

When the abnormality check has not yet been executed (S458:No), ECU 20 shifts process to S460. The process after S460 is same as process after S406 of FIG. 3.

According to the third behavior information storage process and an abnormality check process of FIG. 5, immediately after the storage of the behavior information in SRAM 28 or EEPROM 30 (S442), the abnormality check of the operation of CPU 22 is executed when the vehicle is in a safe condition (e.g. vehicle speed is 0). Therefore, instead of executing the abnormality check immediately after the storage of the behavior information, the influence of the abnormality check of the operation of CPU 22 on the vehicle behavior is reduced.

(First Output Process)

Figure 6:
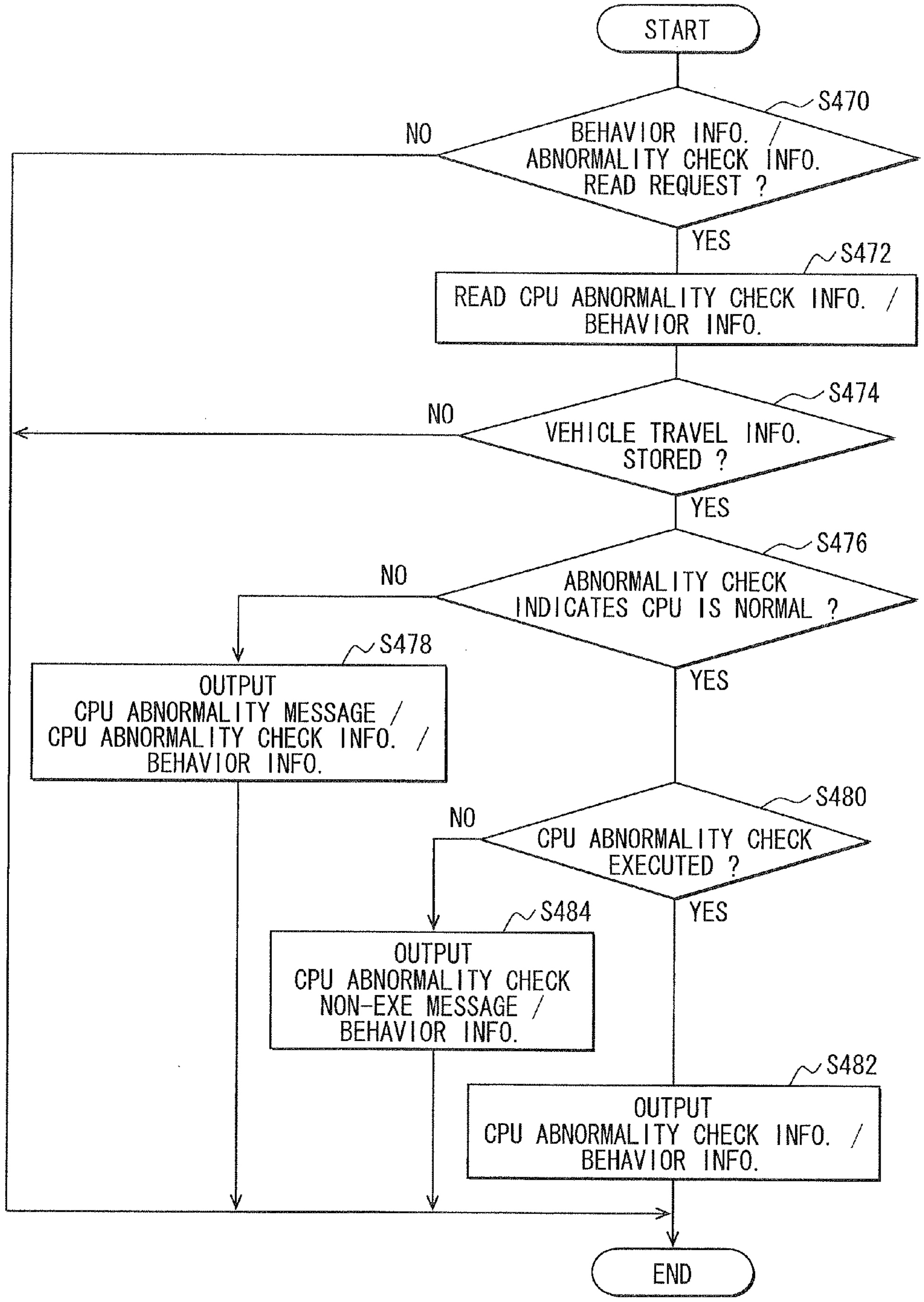
FIG. 6 is a flowchart of a first output process of a diagnosis tool of the diagnosis system of the present disclosure.

FIG. 6 is a flowchart of a first output process executed in the diagnosis tool 100 in correspondence to the process of the ECU 20 shown in FIG. 3 or 5.

When a read request for reading the behavior information of the vehicle and the abnormality check information regarding the abnormality check of the operation of CPU 22 is issued (S470:Yes), the diagnosis tool 100 reads the relevant information from the predetermined memory area of SRAM 28 or EEPROM 30 of ECU 20 (S472). For example, the diagnosis tool 100 reads the storage execution information indicating whether the vehicle travel information is stored due to the detection of the specific vehicle behavior, as well as the behavior information including time of execution of such storage and the vehicle travel information at such time, together with the abnormality check result of the operation of CPU 22 and the abnormality check information including time at such time of storage.

When the storage execution information of the behavior information does not indicate that the vehicle travel information is stored (S474:No), ECU 20 finishes the present process.

When the storage execution information indicates that the vehicle travel information has been stored (S474:Yes), ECU 20 determines whether the abnormality check result for the operation of CPU 22 is normal (S476). When the abnormality check result is abnormal (S476:No), the diagnosis tool 100 outputs a message of abnormality of the operation of CPU 22, the abnormality check information about the abnormality check of the operation of CPU 22 and the behavior information about the generation of the specific vehicle behavior, to a display unit of the diagnosis tool 100 (S478). The abnormal message may look like, for example, "CPU is abnormal" or the like.

When the abnormality check result is normal (S476:Yes) and based on the check execution information that is included in the abnormality check information of CPU 22, which is retrieved from ECU 20, the diagnosis tool 100 determines whether the abnormality check of the operation of CPU 22 has actually been executed (S480).

In the process of FIG. 3 or FIG. 5, the abnormality check of the operation of CPU 22 is executed in the interval after the stop of the engine and before shutoff of power supply. If power supply for ECU 20 is interrupted during the execution of the abnormality check due to the trouble of the main relay control circuit 60 or the like, the abnormality check may not be normally finished.

Furthermore, since the initial value of the abnormality check result is set to "normal" in the present embodiment, the value of the abnormality check result indicating "normal" may falsely represent a "normal" check result even when no abnormality check has actually been executed. Therefore, the "normal" value of the abnormal check result has to be re-checked, in terms of whether it is a result of the actually-executed abnormality check or it is a result of no abnormality check.

When the abnormality check has been executed (S480: Yes), the diagnosis tool 100 displays the behavior information about the generation of the specific vehicle behavior and the abnormality check information about the abnormality check of the operation of CPU 22 (S482).

When the abnormality check has not actually been executed (S480:No), the diagnosis tool 100 displays a message that the abnormality check of the operation of CPU 22 has not been executed, and the behavior information about the generation of the specific vehicle behavior, and the abnormality check information about the abnormality check of the operation of CPU 22 (S484). The message that the abnormality check has not been executed may look like, for example, "abnormality check not yet executed" or the like.

(Second Output Process)

Figure 7:
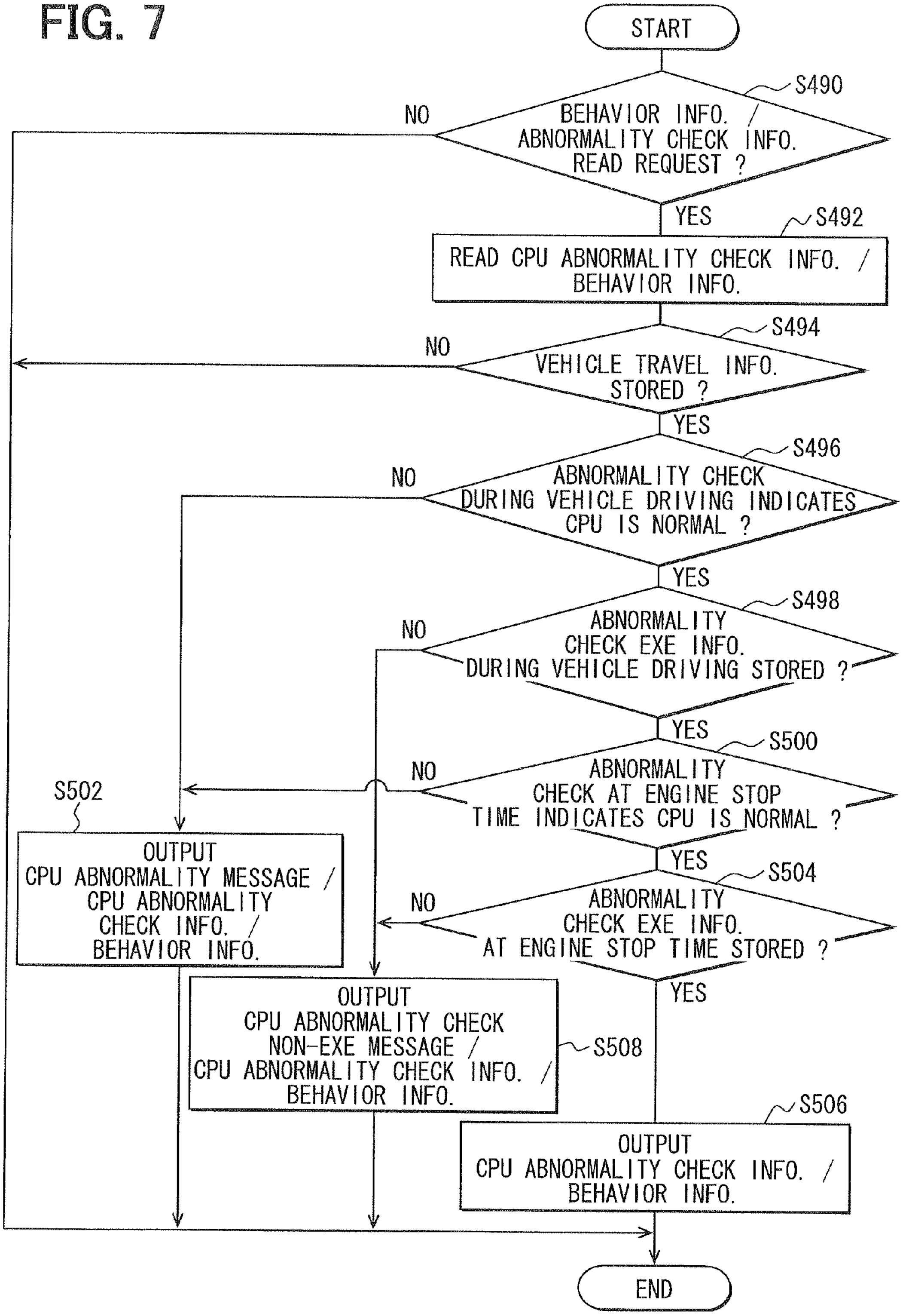
FIG. 7 is a flowchart of a second output process of the diagnosis tool of the present disclosure.

FIG. 7 is a flowchart of a second output process executed by the diagnosis tool 100, in correspondence to the process of the ECU 20 shown in FIG. 4. When comparing the process of FIG. 7 with the process of FIG. 6, S496 and S498 of FIG. 7 are new, and S490 to S494, S500 to S508 of FIG. 7 correspond to S470 to S474 and S476 to S484 of FIG. 6, respectively.

With reference to FIG. 7, when a read request for reading the behavior information of the vehicle and the abnormality check information about the abnormality check of the operation of CPU 22 is issued (S490:Yes), the diagnosis tool 100 reads the relevant information from the predetermined memory area of SRAM 28 or EEPROM 30 of ECU 20 (S492). When the storage execution information of the behavior information indicates the storage of the vehicle travel information (S494:Yes), the diagnosis tool 100 checks whether the abnormality check result of the operation of CPU 22 during the driving of the vehicle is normal or not (S496).

When the abnormality check result during the driving of the vehicle is abnormal (S496:No), the diagnosis tool 100 outputs a message that the operation of CPU 22 is abnormal and the abnormality check information and the behavior information to the display unit of the diagnosis tool 100 (S502), similar to S478 of FIG. 6.

When the abnormality check result during the driving of the vehicle is normal (S496:Yes), based on the check execution information included in the abnormality check information of CPU 22 which is read from ECU 20, the diagnosis tool 100 checks whether the abnormality check of the operation of CPU 22 has actually been executed during the driving of the vehicle (S498).

As described above, the initial value of the abnormality check result of the operation of CPU 22 during the driving of the vehicle is set to "normal" in the present embodiment. Therefore, by re-checking the abnormality check result, whether the actually-executed abnormality check yielded the "normal" check result is determined.

When the abnormality check during the driving of the vehicle has actually been executed (S498:Yes), the diagnosis tool 100 continues to S500. The process after S500 is the same as the process after S476 of FIG. 6.

When the abnormality check during the driving of the vehicle has not actually been executed (S498:No), just like S484 of FIG. 6, the diagnosis tool 100 displays the message that the abnormality check of the operation of CPU 22 has not been executed, and the behavior information about the generation of the specific vehicle behavior, and the abnormality check information about the abnormality check of the operation of CPU 22 (S508).

Further, in the second output process of FIG. 7, when the abnormality check result during the driving of the vehicle is abnormal (S496:No), the abnormality check information at the engine stop time is not outputted, However, the abnormality check information at the engine stop time may be outputted when the abnormality check result during the driving of the vehicle is abnormal.

Further, when the abnormality check of the operation of CPU 22 is not executed during the driving of the vehicle (S498:No), the abnormality check information at the engine stop time is not output. However, the abnormality check information at the engine stop time may be output when the abnormality check of the operation of CPU 22 is not executed during the driving of the vehicle.

Further, in S506 of the second output process of FIG. 7, it may be desirable to output the abnormality check information of both of the during-driving and at the engine stop time.

(Third Output Process)

Figure 8:
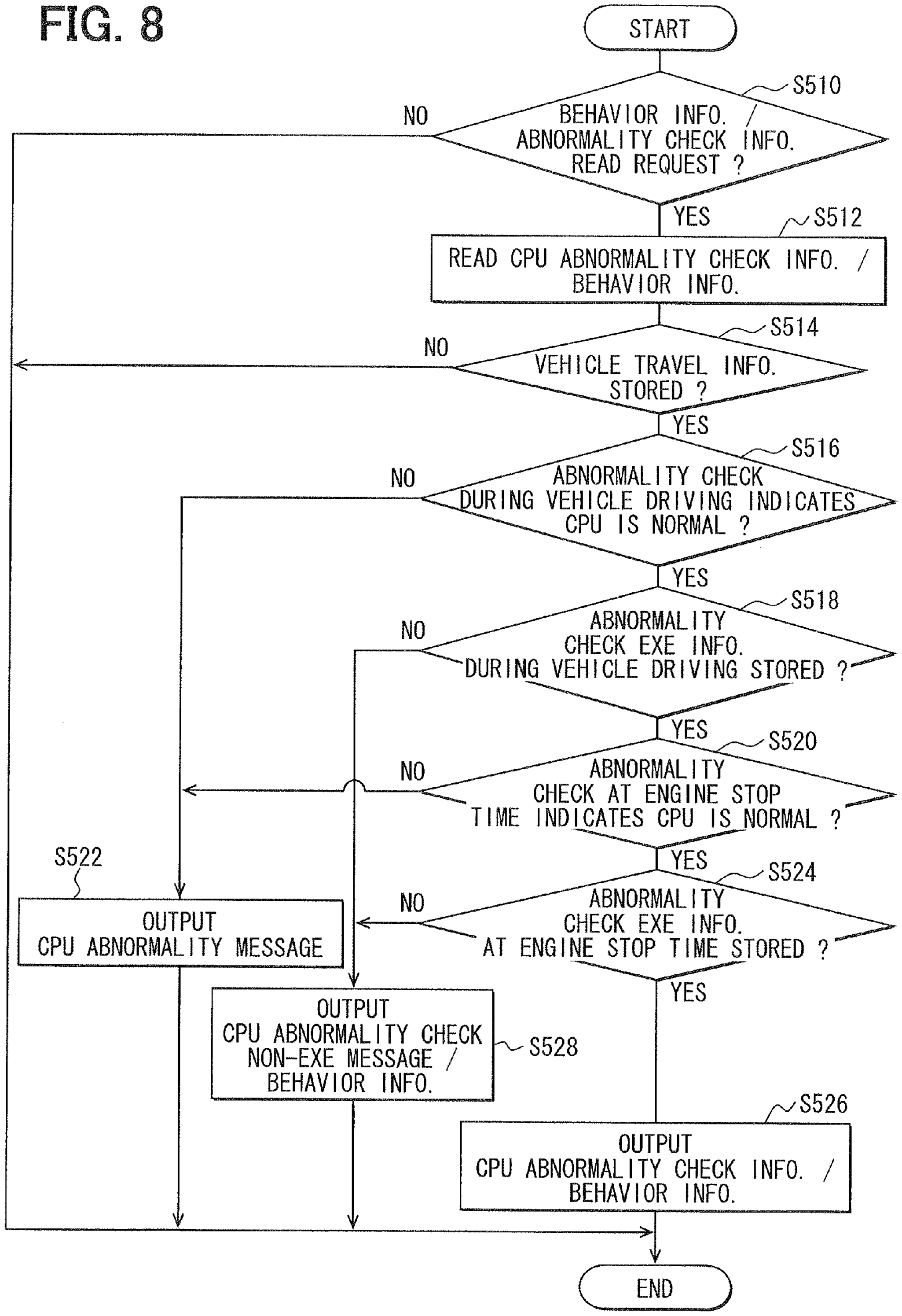
FIG. 8 is a flowchart of a third output process of the diagnosis tool of the present disclosure.

When comparing a third output process of FIG. 8 with the second output process of FIG. 7, in place of S502 of FIG. 7, S522 of FIG. 8 is executed. Other steps of S510 to S520, S524 to S528 of FIG. 8 correspond to as S490 to S500, S504 to S508 of FIG. 7, respectively.

When the abnormality check result during the driving of the vehicle or at the engine stop time is abnormal (S516:No, S520:No), the diagnosis tool 100 displays the message of the operation abnormality of CPU 22 only, and does not display the behavior information of the vehicle and the abnormality check information of CPU 22 (S522).

In the embodiment described above, when the specific vehicle behavior is detected and the vehicle travel information is stored as the behavior information, the abnormality check whether or not the operation of CPU 22 is abnormal is executed after the storage of the behavior information and before the shutoff of power supply, and the abnormality check result is stored as the abnormality check information in SRAM 28 or EEPROM 30.

As a result, when the abnormality check result indicating that the operation of CPU 22 is normal is stored, the cause of the generation of the specific vehicle behavior is analyzed based on the stored vehicle travel information. On the other hand, when the abnormality check result indicating that the operation of CPU 22 is abnormal is stored, without using/trusting the stored vehicle travel information, the cause of the specific vehicle behavior is appropriately analyzed as the operation abnormality of CPU 22.

As a part of the behavior information, a time of storing the vehicle travel information and a time of execution of the abnormality check of the operation of CPU 22 are stored. The time difference between the two times is used to determine the degree of relevance of the abnormality check result of the operation of CPU 22 to the detection of the specific vehicle behavior. For example, when the time difference is short, it may be determined that it is highly possible for the specific vehicle behavior to be detected in a CPU operation condition that is indicated by the abnormality check result of the operation of CPU 22. When the time difference is long, it may be determined that it is unlikely for the specific vehicle behavior to be detected in a CPU operation condition that is indicated by the abnormality check result of the operation of CPU 22. For example, a normal cycle may be 65 ms, and if the abnormality check is performed before the second cycle (i.e. 130 ms) the abnormality check result is reliable. Therefore the time difference may be about 100 ms. However, it should be understood that the time difference for determining if the abnormality check result is reliable may be provided as a value different from 100 ms.

In addition, the check execution information, which indicates whether the abnormality check of the operation of CPU 22 has been executed, is included as part of the abnormality check information. Therefore, when the check execution information does not indicate that the abnormality check has been executed, the reliability of the vehicle travel information stored may be determined as low regardless of the abnormality check result.

As a result of reading the behavior information and the abnormality check information from SRAM 28 or EEPROM 30 of ECU 20, when the storage execution information of the behavior information indicates that the vehicle travel information has been stored and the abnormality check result of the abnormality check information indicates that the operation of CPU 22 is normal, the diagnosis tool 100 outputs the behavior information and the abnormality check information. When the abnormality check result indicates that the operation of CPU 22 is abnormal, the diagnosis tool 100 at least outputs an operation abnormality warning regarding the operation of CPU 22 but may also output the abnormality check information and the behavior information.

As described above, based on the behavior information and the abnormality check information that is retrieved from ECU 20, the diagnosis tool 100 automatically adjusts its output, so that the operation of CPU 22 is distinctively determined either as normal or abnormal. As a result, an operator may not have to run additional analysis to determine whether the operation of CPU 22 is normal or abnormal, thereby saving the operator time related to the adjustment of the output based on the behavior information and the abnormality check information retrieved from ECU 20.

Further, when the storage execution information of the behavior information indicates that the vehicle travel information has been stored and the abnormality check result of the abnormality check information indicates that the operation of CPU 22 is normal, the diagnosis tool 100 outputs a warning that warns that the abnormality check of the operation of CPU 22 has not been executed if the check execution information of the abnormality check information indicates that the abnormality check of the operation of CPU 22 has not been executed.

Based on the behavior information and the abnormality check information that are retrieved from ECU 20 in the present embodiment, the diagnosis tool 100 automatically adjusts its output so that the abnormality check of the operation of CPU 22 is distinctively determined either as executed or not executed. As a result, the operator may not need to perform additional analysis to determine whether the abnormality check of the operation of CPU 22 has been executed, thereby saving the operator time related to the adjustment of the output based on the behavior information and the abnormality check information retrieved from ECU 20.

In the present embodiment, ECU 20 may be provided as the in-vehicle electronic control unit in claims, and SRAM 28 or EEPROM 30 may be provided as a memory unit in claims, and the memory area of ROM 24 and RAM 26 may be provided as a memory area of a CPU in claims.

Further, ECU 20 realizes a function of a behavior check unit, a behavior information storage unit, an abnormality check unit, a check result storage unit and an execution condition check unit in claims. Further, the diagnosis tool 100 realizes a function of a read unit and an output unit in claims.

Further, the function of the behavior check unit in claims may be provided as a process S400 of FIG. 3, a process of S420 of FIG. 4, and/or a process of S440 of FIG. 5. The function of the behavior information storage unit in claims may be provided as a process of S402 of FIG. 3, a process of S422 of FIG. 4, and/or a process of S442 of FIG. 5. The function of the abnormality check unit in claims may be provided as a process of S408 of FIG. 3, a process of S424 and S432 of FIG. 4, and/or a process of S452 and S462 of FIG. 5. The function of the check result storage unit in claims may be provided as a process of S410 of FIG. 3, a process of S426 and S434 of FIG. 4, and/or a process of S454 and S464 of FIG. 5. The function of the execution condition check unit in claims may be provided as a process of S450 of FIG. 5.

Further, a function of the read unit in claims may be provided as a process of S472 of FIG. 6, a process of S492 of FIG. 7, and/or a process of S512 of FIG. 8. A function of an output unit in claims may be provided as a process of S478, S482, and S484 of FIG. 6, a process of S502, S506 and S508 of FIG. 7, and/or a process of S522, S526 and S528 of FIG. 8.

Other Embodiments

In the above embodiment, during the driving of the vehicle in which the specific vehicle behavior is detected and the behavior information is stored, when the data check, such as the sum check calculation, is executed for ROM 24 and RAM 26 as an abnormality check of the operation of CPU 22, the data check is executed only for a portion of the memory area, in order to reduce the influence of the abnormality check on other processes. However, just like the engine stop time, the data check, such as the sum check, may be executed for the entire area of the memory area during the driving of the vehicle.

Further, when the specific vehicle behavior is detected the vehicle travel information, the storage time of the vehicle travel information, and the storage execution information are stored as the behavior information in the above embodiment. However, the vehicle travel information may at least be stored as the behavior information, and at least one of storage time of the vehicle travel information and the storage execution information may not be required.

Further, the abnormality check result of CPU 22, the time when the abnormality check is executed, and check execution information indicating whether the abnormality check has been executed are stored as the abnormality check information of CPU 22, in the above embodiment. However, as the abnormality check information, only the abnormality check result may be stored, and the storage of the execution time of the abnormality check and the check execution information may not be necessary.

Further, when the abnormality check of the operation of CPU 22 is executed in the interval after the stop of the engine and before shutoff of power supply, the abnormality check execution condition for saving the abnormality check may be examined. That is, whether to omit/stop the execution of the abnormality check of the operation of CPU 22 for prioritizing a process having a higher priority than the abnormality check of the operation of CPU 22 may be checked.

Further, not only the engine ECU but also other in-vehicle ECUs may execute the abnormality check of a CPU that executes the vehicle control process during a period after the storage of the vehicle travel information due to the detection of the specific vehicle behavior and before shutoff of power supply and may store the abnormality check result in the memory unit.

Further, not only the memory unit of the subject ECU but also the memory unit of the other ECU may store the behavior information including the vehicle travel information and may store the abnormality check information including the abnormality check result.

Further, the memory unit for storing the behavior information of the vehicle at the time of detection of the specific vehicle behavior and for storing the abnormality check information of CPU 22 may not only be SRAM 28 or EEPROM 30 but may also be any storage unit that retains data while the driving of the vehicle is stopped.

The present disclosure may be applicable to any one of the engine vehicle that has a gasoline engine or an internal combustion engine, such as diesel engine, as its driving power source. The vehicle may also be a hybrid vehicle that uses both an internal combustion engine and a motor as its driving power source, or an electric vehicle that uses only a motor as its driving power source.

Although the present disclosure has been fully described in connection with preferred embodiments thereof with reference to the accompanying drawings, it is to be noted that various changes and modifications will become apparent to those skilled in the art. Further, such changes, modifications, and summarized schemes are to be understood as being within the scope of the present disclosure as defined by appended claims.

What is claimed is:

1. An in-vehicle electronic control unit installed in a vehicle comprising:

a central processing unit (CPU) executing a vehicle control process;

a behavior check unit determining whether a specific vehicle behavior is detected;

a behavior information storage unit storing in a memory unit, which retains data during a drive stop time of the vehicle, vehicle travel information as a behavior information of the vehicle when the behavior check unit determines a specific vehicle behavior is detected, the drive stop time being defined as a time at which an engine of the vehicle is shutdown and the engine has an engine speed of zero;

an abnormality check unit executing an abnormality check to determine whether an operation of the CPU is abnormal during a time period after the storage of the vehicle travel information in the memory unit by the behavior information storage unit and between the drive stop time of the vehicle and a shutting off of a power supply to the CPU; and a check result storage unit storing in the memory unit an abnormality check result of the abnormality check unit as an abnormality check information.

2. The in-vehicle electronic control unit of claim 1, wherein the abnormality check unit evaluates a part of a memory area that is used by the CPU for executing the abnormality check of the operation of the CPU.

3. The in-vehicle electronic control unit of claim 1 further comprising:

an execution condition check unit determining whether an execution condition of the abnormality check is satisfied when the behavior information storage unit stores in the memory unit the vehicle travel information, wherein, upon receiving a determination by the execution condition check unit that the execution condition of the abnormality check is satisfied, the abnormality check unit executes the abnormality check.

4. The in-vehicle electronic control unit of claim 1, wherein the behavior information storage unit stores in the memory unit, as part of the behavior information, a time of storing the vehicle travel information, and the check result storage unit stores in the memory unit, as part of the abnormality check information, a time of executing the abnormality check by the abnormality check unit.

5. The in-vehicle electronic control unit of claim 1, wherein the check result storage unit stores in the memory unit, as part of the abnormality check information, check execution information that indicates whether the abnormality check unit has executed the abnormality check.

6. The in-vehicle electronic control unit of claim 1, wherein the abnormality check unit executes the abnormality check at an earliest-possible timing after the storage of the vehicle travel information in the memory unit.

7. A diagnosis tool coupled to an in-vehicle electronic control unit installed in a vehicle, wherein the in-vehicle electronic control unit includes a behavior information storage unit that stores a vehicle travel information as a behavior information of the vehicle when a specific vehicle behavior is detected, an abnormality check unit that determines whether an operation of a central processing unit (CPU) is abnormal during a time period after the storage of the vehicle travel information in the memory unit by the behavior information storage unit and between a drive stop time of the vehicle and a shutting off of a power supply to the CPU, the drive stop time being defined as a time at which an engine of the vehicle is shutdown and the engine has an engine speed of zero, and a check result storage unit that stores in the memory unit an abnormality check result of the abnormality check unit as an abnormality check information, the diagnosis tool comprising:

a read unit reading the behavior information and the abnormality check information from the in-vehicle electronic control unit; and an output unit, wherein based on the behavior information read by the read unit, when the vehicle information is stored in the memory unit and when the abnormality check information indicates that the CPU operation is normal, the output unit outputs the behavior information and the abnormality check information, and when the vehicle information is stored in the memory unit and when the abnormality check information indicates that the CPU operation is abnormal, the output unit outputs a CPU operation abnormality warning.

8. The diagnosis tool of claim 7, wherein the output unit outputs, in addition to the CPU operation abnormality warning, at least one of the behavior information and the abnormality check information, when the vehicle information is stored in the memory unit and when the abnormality check information indicates that the CPU operation is abnormal.

9. The diagnosis tool of claim 7, wherein the abnormality check information read by the read unit indicates whether the abnormality check unit has executed the abnormality check, the output unit outputs the behavior information and the abnormality check information, when the abnormality check information indicates that the abnormality check has been executed and when the behavior information read by the read unit indicates that the vehicle travel information is stored in the memory unit, and the output unit outputs the behavior information, the abnormality check information, and a warning that indicates that the abnormality check has not been executed, when the abnormality check information indicates that the abnormality check has not been executed.

10. A diagnosis system comprising:

an in-vehicle electronic control unit installed in a vehicle, the in-vehicle electronic control unit including, a central processing unit (CPU) executing a vehicle control process, a behavior check unit determining whether a specific vehicle behavior is detected, a behavior information storage unit storing in a memory unit, which retains data during a drive stop time of the vehicle, vehicle travel information as behavior information of the vehicle when the behavior check unit determines a specific vehicle behavior is detected, the drive stop time being defined as a time at which an engine of the vehicle is shutdown and the engine has an engine speed of zero, an abnormality check unit executing an abnormality check to determine whether an operation of the CPU is abnormal during a time period after the storage of the vehicle travel information in the memory unit by the behavior information storage unit and between the drive stop time of the vehicle and a shutting off of a power supply to the CPU, and a check result storage unit storing in the memory unit an abnormality check result of the abnormality check unit as abnormality check information; and a diagnosis tool including a read unit reading the behavior information and the abnormality check information from the in-vehicle electronic control unit; and an output unit outputting information, when, based on the behavior information read by the read unit, the vehicle travel information is stored in the memory unit.

11. The diagnosis system of claim 10, wherein when the abnormality check result of the abnormality check information indicates that the CPU operation is normal, the output unit outputs the behavior information and the abnormality check information, and when the abnormality check result of the abnormality check information indicates that the CPU operation is abnormal, the output unit outputs a CPU operation abnormality warning.

12. The diagnosis system of claim 11, wherein the output unit outputs, in addition to the CPU operation abnormality warning, at least one of the behavior information and the abnormality check information, when the abnormality check information indicates that the CPU operation is abnormal.

13. The diagnosis system of claim 10, wherein the check result storage unit of the in-vehicle electronic control unit stores in the memory unit, as a part of the abnormality check information, check execution information that indicates whether the abnormality check unit executed the abnormality check, when the check execution information indicates that the abnormality check has been executed while the vehicle travel information is stored in the memory unit, the output unit outputs the behavior information and the abnormality check information, and when the check execution information indicates that the abnormality check has not been executed, the output unit outputs, in addition to the behavior information and the abnormality check information, a warning that indicates that the abnormality check has not been executed.

* * * * *